US012680464B2

(12) United States Patent
Edynak et al.

(10) Patent No.: US 12,680,464 B2
(45) Date of Patent: Jul. 14, 2026

(54) PLATFORM FOR A FAN ASSEMBLY

(71) Applicant: SAFRAN AIRCRAFT ENGINES, Paris (FR)

(72) Inventors: Jérémy Philippe Pierre Edynak, Moissy-Cramayel (FR); Eddy Keomorakott Souryavongsa, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/561,861

(22) PCT Filed: May 13, 2022

(86) PCT No.: PCT/FR2022/050921

§ 371 (c)(1),
(2) Date: Nov. 17, 2023

(87) PCT Pub. No.: WO2022/243628

PCT Pub. Date: Nov. 24, 2022

(65) Prior Publication Data

US 2024/0229669 A1 Jul. 11, 2024

(30) Foreign Application Priority Data

May 18, 2021 (FR) .................................. FR2105184

(51) Int. Cl.
*F01D 11/00* (2006.01)

(52) U.S. Cl.
CPC ........ *F01D 11/008* (2013.01); *F05D 2220/36* (2013.01); *F05D 2300/603* (2013.01)

(58) Field of Classification Search
CPC ............... F01D 11/008; F05D 2220/36; F05D 2300/603; F05D 2260/31; Y02T 50/60
See application file for complete search history.

(56) References Cited

U.S. PATENT DOCUMENTS

2008/0273980 A1 11/2008 Belmonte et al.
2014/0003949 A1 1/2014 Adam et al.
(Continued)

FOREIGN PATENT DOCUMENTS

EP 1 967 695 A1 9/2008
EP 3058180 B1 * 12/2018 ............ F01D 11/008
(Continued)

OTHER PUBLICATIONS

French Preliminary Search Report for French Application No. 2105184, dated Nov. 23, 2021.
(Continued)

*Primary Examiner* — Chelsea E Stinson
*Assistant Examiner* — Eric A Lange
(74) *Attorney, Agent, or Firm* — Birch, Stewart, Kolasch & Birch, LLP

(57) ABSTRACT

The present invention relates to a platform for a fan assembly, comprising a flow passage wall extending in an axial direction having an upstream end and a downstream end, and comprising two axial stiffeners. The platform comprises radial retention means positioned at the upstream end and at the downstream end of the flow passage wall, the radial retention means being designed to each define a sliding connection with a corresponding shroud of the fan assembly and in that it comprises tangential retention means designed to define a sliding pivot connection between the platform and a disc of the fan assembly.

12 Claims, 4 Drawing Sheets

(56) References Cited

U.S. PATENT DOCUMENTS

| | | | | |
|---|---|---|---|---|
| 2014/0186187 | A1* | 7/2014 | Lamboy | F02K 3/06 29/889.2 |
| 2016/0076388 | A1* | 3/2016 | Robertson | F01D 5/02 416/230 |
| 2016/0160663 | A1* | 6/2016 | Mortier | F01D 11/008 264/103 |
| 2017/0335859 | A1* | 11/2017 | Duelm | F04D 29/023 |
| 2017/0350413 | A1* | 12/2017 | Boyer | F04D 29/023 |
| 2018/0117807 | A1 | 5/2018 | Marchal et al. | |
| 2022/0055252 | A1 | 2/2022 | Obert et al. | |

FOREIGN PATENT DOCUMENTS

| | | | |
|---|---|---|---|
| FR | 2 992 676 | A1 | 1/2014 |
| FR | 3 018 473 | A1 | 9/2015 |
| FR | 3 029 563 | A1 | 6/2016 |
| WO | WO 2017/209963 | A1 | 12/2017 |
| WO | WO 2020/128397 | A1 | 6/2020 |

OTHER PUBLICATIONS

International Search Report for International Application No. PCT/FR2022/050921, dated Sep. 2, 2022.

* cited by examiner

PLATFORM FOR A FAN ASSEMBLY

FIELD OF THE INVENTION

The present invention relates to the field of platforms for bladed wheels.

PRIOR ART

In a known manner, as shown schematically in FIG. 1, a low-pressure compressor can be composed of a bladed wheel X for a fan which comprises a casing, a fan disc I, several blades and their retention systems, several platforms III, and an upstream shroud IV.

In a known manner, the platform is an integral part of the bladed wheel for the fan constituting the first moving wheel stage. It must ensure the following functions:

- Main aerodynamic function:
  - defining an air flow passage.
- Satisfy all the operating conditions:
  - ensuring the performance of the entire flight envelope
  - guaranteeing the safety requirements
  - guaranteeing the availability of the engine for commercial use
- Integration in the engine environment:
  - having interfaces that are coherent with the boundaries of the moving wheel stage,
  - avoiding disturbances in the other stages of the low-pressure compressor.

More precisely, the performance and integration requirements are manifest by good sealing of the blade close to its root retained in the disc. This sealing is directly controlled by the capacity of the platform to be associated with the blade close to its root, and to do so at all operating points. Up to a certain clearance, it can be filled by using a seal. Above a certain clearance, it is difficult to ensure sealing.

Moreover, the performance and integration requirements are also manifest by a capacity to reduce the hub ratio. The lower this ratio, the more the flow rate increases and the better the performance of the fan will be. The reduction of this hub ratio prevents the integration of a so-called “box” platform known from the prior art. Indeed, these platforms have a box which provides the necessary stiffness for the platform in order to support acceptable levels of movement and mechanical stresses. The platform is retained upstream and downstream, for example, in correspondence with shrouds and for example an upstream end of the platform can comprise a substantially radial tab which is attached by bolts (for the principle, refer for example to the teaching of document FR-2 992 676) on the disc or an intermediate part connected to the disc. Document FR-3 029 563 proposes a key for locking the box with respect to the disc. This mode of attachment is very stable but makes the platform particularly bulky, which leads to a high hub ratio.

Thus, many documents of the prior art seek to solve the problem of the conflict between optimal attachment of the platform and obtaining a low hub ratio. For example, reference can be made to document US 20140186187 which describes a platform having a refined upstream attachment, so as to maintain a low hub ratio.

However, currently, two main solutions are distinguished for attaching a platform to the disc while maintaining a low hub ratio. According to a first solution, the platform is screwed on radial extensions of the disc (as is the case for the platform described in document US 20140186187). According to another provision, the platform is retained by a plurality of hooks carried by the disc.

These known solutions are particularly restrictive. More specifically, the multiplicity of screws or hooks imposes a certain assembly kinematics often involving swivelling the platform around the axis of rotation, then axial movement in order to engage the platform in the hooks. However, this axial movement can have an impact on the clearance previously described, creating gaps that are difficult to fill with a seal.

In this context, it is necessary to provide a platform that can be attached to a disc in a simple manner, having a low hub ratio while guaranteeing sufficient clearance to the blade and enabling the sealing of the connection with the blade root to be managed.

DISCLOSURE OF THE INVENTION

According to a first aspect, the invention proposes a bladed wheel platform, comprising a flow passage wall extending in an axial direction and having an upstream end and a downstream end, and comprising two axial stiffeners. The platform comprises radial retention means positioned at the upstream end and the downstream end of the flow passage wall, the radial retention means being suitable for each defining a sliding connection with a corresponding shroud of the bladed wheel and in that it comprises tangential retention means suitable for defining a sliding pivot connection between the platform and a disc of the bladed wheel.

The tangential retention means can comprise a pin and a tab having a drilled hole suitable for receiving the pin, such that the assembly comprising the tab and the pin forms a sliding pivot connection.

The tab can be attached to the flow passage and the pin can be suitable for being attached to the disc of the bladed wheel.

The radial retention means comprise an upstream circumferential land and a downstream circumferential land, which are suitable for being respectively engaged in a corresponding upstream shroud and downstream shroud of the bladed wheel.

The flow passage and the stiffeners can be made of composite materials.

According to a second aspect, the invention relates to an assembly of a bladed wheel disc and a platform, wherein the disc receives the platform and has a fitting in which is attached the pin suitable for being engaged in sliding pivot connection in the tab of the platform.

The disc can receive the platform and can comprise at least one downstream shroud suitable for receiving the downstream circumferential land and at least one upstream shroud suitable for receiving the upstream circumferential land.

According to another aspect, the invention relates to a turbomachine comprising at least one assembly according to the invention.

According to another aspect, the invention relates to an aircraft comprising at least one turbomachine according to the invention.

DESCRIPTION OF THE FIGURES

Other features, aims and advantages of the invention will emerge from the following description, which is given purely by way of illustration and not being limiting and which should be read with reference to the attached drawings, in which.

DETAILED DESCRIPTION OF THE INVENTION

Context of the Bladed Wheel

Figure 1:
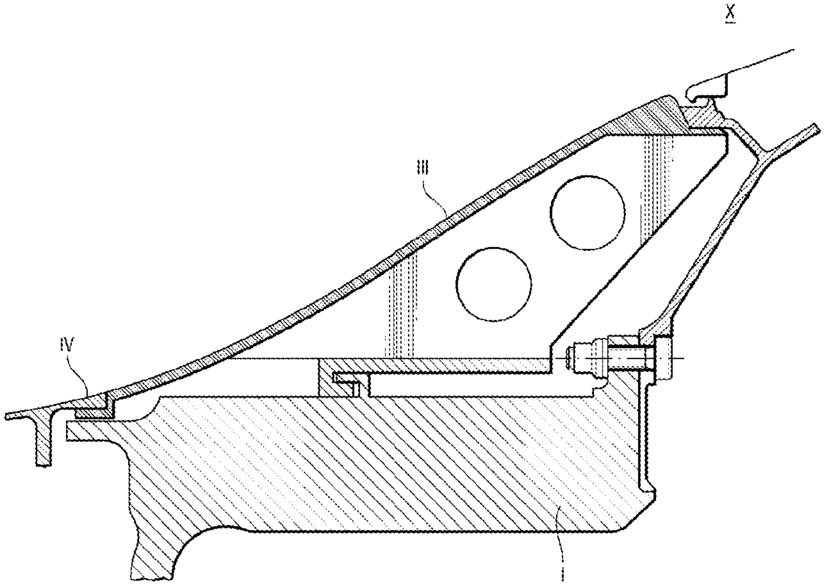
FIG. 1 is a schematic representation of a bladed wheel of the prior art.

The invention is positioned in a bladed wheel 1 of a fan. Typically, this is a low-pressure compressor fan.

The bladed wheel 1 comprises a disc 2 on which blades 4 are attached. Platforms 6 are at the interface between the blades 4 and the disc 2 in order in particular to create, by an upper face of the platform, a flow inside the flow passage between the blades close to their root which is held in the disc in a conventional socket of the disc.

As will be described, the invention relates to the platforms 6 and the disc 2, and more particularly to the connection between the platforms 6 and the disc 2.

Platform

According to a first aspect, the invention proposes a platform 6 of a bladed wheel 1.

Figure 2:
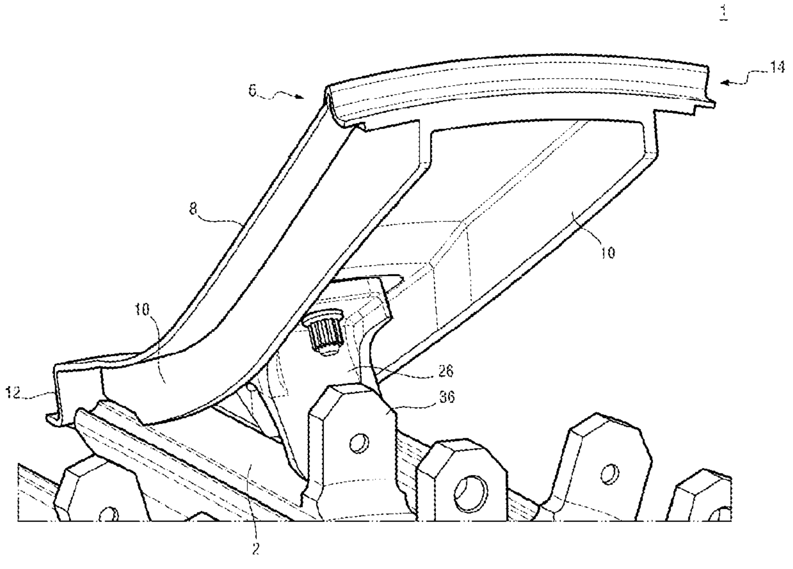
FIG. 2 is a perspective representation of the assembly comprising a platform and a disc according to the invention.

With reference, in particular, to FIG. 2, the platform 6 according to the invention comprises a flow passage wall 8 which extends in an axial direction. The flow passage wall 8 has its so-called upper face opposite the disc, defining a surface shape which promotes a fluid flow in an overall longitudinal direction between the blades inside the flow passage. In this case, the flow passage wall 8 extends in an axial direction between an upstream region and a flow passage wall 8 able to promote the flow of air in the fan between the upstream side and downstream side of the bladed wheel 1.

In a particularly advantageous manner, the flow passage wall 8 is made of composite material. This choice of material makes it possible to have a flow passage wall 8 having optimum curvature. Indeed, the choice of a flow passage wall 8 made of composite material makes it possible to shape the flow passage 8 according to a desired surface geometry (as opposed to a sheet-metal which is more difficult to shape). Furthermore, in the case of a blade made of composite material, the flow passage wall made of composite material promotes less aggressiveness of this wall with regard to the blades in the event of significant impact on said blades.

In addition, the platform 6 comprises two axial stiffeners 10. The stiffeners 10 are positioned under the wall of the flow passage 8 in order to stiffen it. The term bottom face means that when the platform 6 is attached to a disc 2, the stiffeners 10 are located between the disc 2 and the flow passage wall 8. Hence the air flow can flow over the flow passage wall 8 without being disturbed by the stiffeners 10. In other words, the architecture of the platform 6 with a flow passage 8 stiffened by axial stiffeners 10 makes it very advantageously possible to have a mechanically resistant structure which offers an optimum surface for the flow of the air flow.

The stiffeners 10 can preferably be made of composite material.

In a particularly advantageous manner, the platform 6 comprises both radial retention means, as well as tangential retention means.

Radial Retention Means

As shown, in particular, in FIG. 2, the radial retention means are disposed upstream 12 and downstream 14 of the platform 6.

Typically, the platform 6 comprises both radial retention means disposed upstream 12, as well as radial retention means disposed downstream 14.

Figure 3:
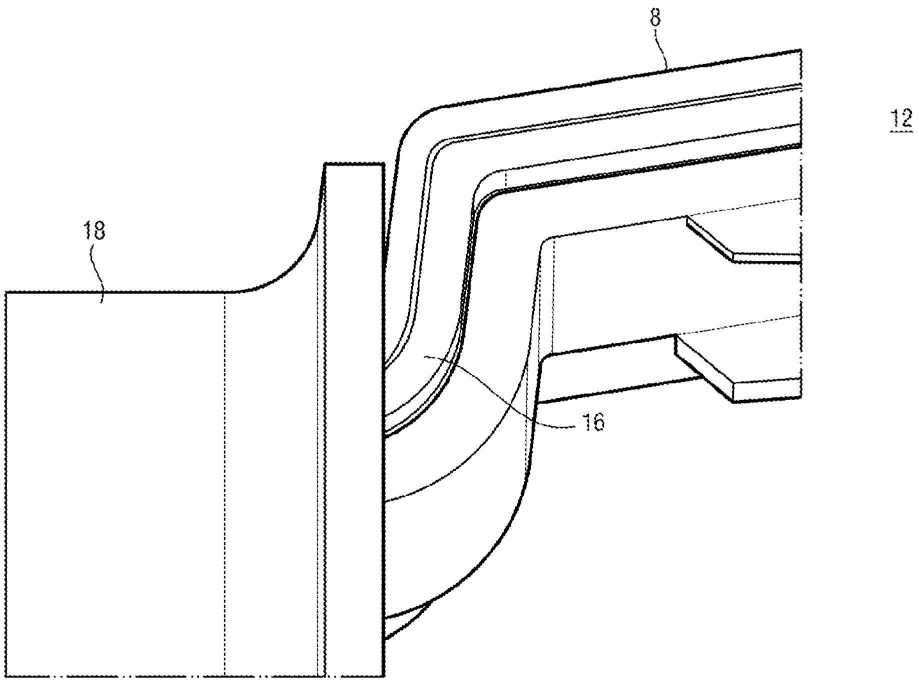
FIG. 3 is a detailed perspective representation of the assembly comprising an upstream circumferential land and an upstream shroud according to the invention.

As shown in FIG. 3, the radial retention means preferably comprise an upstream circumferential land 16, positioned at an upstream end 12 of the platform 6.

It is specified that the term circumferential land means a circumferential rib, i.e. in the shape of a circular arc.

As can be seen in FIG. 3 and as described below, the upstream circumferential land 16 is suitable for engaging in a circumferential groove of an upstream shroud 18. The connection between the upstream circumferential land 16 and the upstream shroud 18 is preferably a sliding connection. Hence, by being positioned in a reference frame of the bladed wheel 1, using the axial, radial and tangential directions, the connection between the upstream circumferential land 16 and the upstream shroud 18 limits the rotational degrees of freedom and prevents translational movements in the radial direction. By contrast, translational movements in the axial direction are permitted. These allow the introduction and removal of the upstream circumferential land 16 in the upstream shroud 18 when the assembly or disassembly needs to be carried out, via the upstream shroud which is removed in this case. The upstream shroud axially retains the upstream side of the platform in order to block the platform in this direction. Moreover, translational movements in the tangential direction are permitted.

Figure 4:
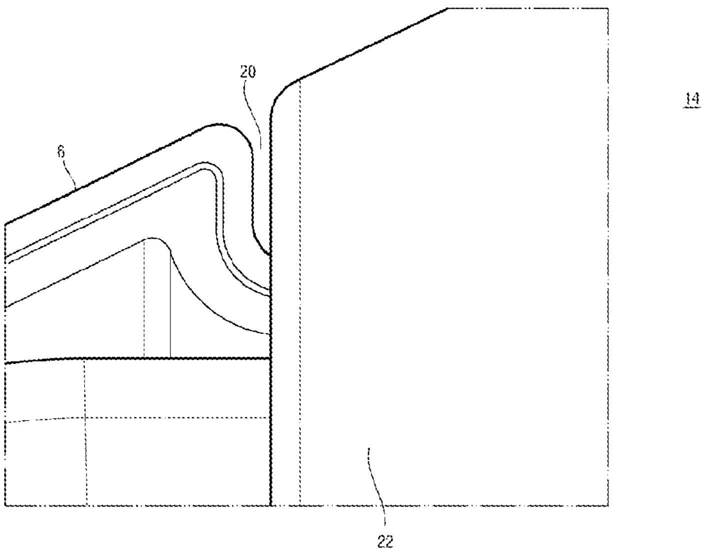
FIG. 4 is a detailed perspective representation of the assembly comprising a downstream circumferential land and a downstream shroud according to the invention.

As is shown in FIG. 4, the radial retention means preferably comprise a downstream circumferential land 20, positioned at a downstream end 14 of the platform.

It is specified that the term circumferential land means a circumferential rib, i.e. in the shape of a circular arc.

As can be seen in FIG. 4 and as described below, the downstream circumferential land 20 is suitable for engaging in a circumferential groove of a downstream shroud 22. The connection between the downstream circumferential land 20 and the downstream shroud 22 is preferably a sliding connection. Hence, by being positioned in a reference frame of the bladed wheel 1, using the axial, radial and tangential directions, the connection between the downstream circumferential land 20 and the downstream shroud 22 limits the rotational degrees of freedom and prevents translational movements in the radial direction. The downstream shroud axially retains the downstream side of the platform in order to block the platform in this direction. By contrast, translational movements in the axial direction are permitted on the downstream side when the upstream shroud is removed for assembly and disassembly operations. These allow, in this case, the introduction and removal of the downstream circumferential land 20 in the downstream shroud 22. Moreover, translational movements in the tangential direction are permitted.

The assembly by the circumferential lands, combined with the production of a flow passage wall made of composite material, make it possible to have a very low hub ratio while minimising the mass of the bladed wheel.

Tangential Retention Means

The platform 6 also comprises tangential retention means.

The tangential retention means are preferably suitable for defining a sliding pivot connection between the platform 6 and the disc 2 of the bladed wheel 1.

With reference to FIGS. 2, 5, 6 and 8, the tangential retention means comprise a tab 26 and a pin 28. The tab 26 has a drilled hole suitable for receiving the pin 28 and hence forming a sliding pivot connection with the pin 28.

The tab 26 is preferably attached to the flow passage wall 8 and the pin 28 is attached to the disc 2.

The tab 26 can be made of metal and be screwed to the bottom face of the flow passage wall 8.

The tab 26 has an attachment portion 26*a* to the flow passage wall 8 of the platform 6 and a connection portion to the disc 26*b* having the drilled hole 30, this portion being intended to be connected with a fitting 36. The attachment portion and the portion having the drilled hole 30 are intersecting. More precisely, with reference to FIG. 5, the attachment portion 26*a* comprises a hooking plate 27*a* intended to be pressed and screwed against the flow passage wall 8. Typically, the hooking plate 27*a* can be screwed to the flow passage wall 8 by two screws 81. In addition, the attachment portion 26*a* comprises two half-arched sides 27*b*. The half-arched sides can mechanically reinforce the connection between the attachment portion 26*a* and the connection portion 26*b*. The term half-arch is intended to mean that each side 27*b* has a curved edge forming a continuous and progressive connection with the connection portion 26*b*. This provision makes it possible to optimise the mechanical strength of the tab 26, in particular by maximising the resistance to bending forces between the attachment portion 26*a* and the connection portion 26*b*.

As will be detailed below, the sliding pivot connection is a particularly advantageous provision of the invention which can ensure blocking in the tangential direction while allowing movements in the axial direction. As will be explained below, this provision is particularly interesting in the case, for example, of an impact (such as by a bird) on the bladed wheel 1.

Disc

According to another aspect, the invention proposes a disc 2 for a bladed wheel 1, suitable for cooperating with a platform 6 according to the invention.

The disc 2 according to the invention has a plurality of brackets 36, each suitable for receiving a pin 28, the brackets 36 being radial protrusions. The term fitting 36 is intended to mean a metal tab or tongue extending in a radial direction and having a drilled hole 30 suitable for receiving a pin 28.

The fitting 36 has an abutment face connected with the connection portion 26*b* of the tab 26.

Figure 5:
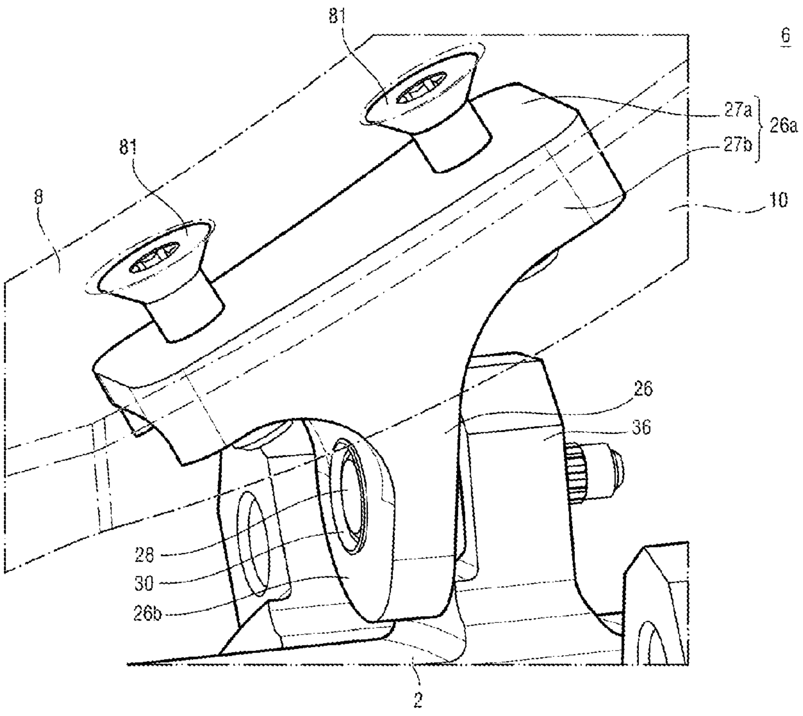
FIG. 5 is a detailed perspective representation of the assembly comprising a pin and a tab of the platform according to the invention.
Figure 6:
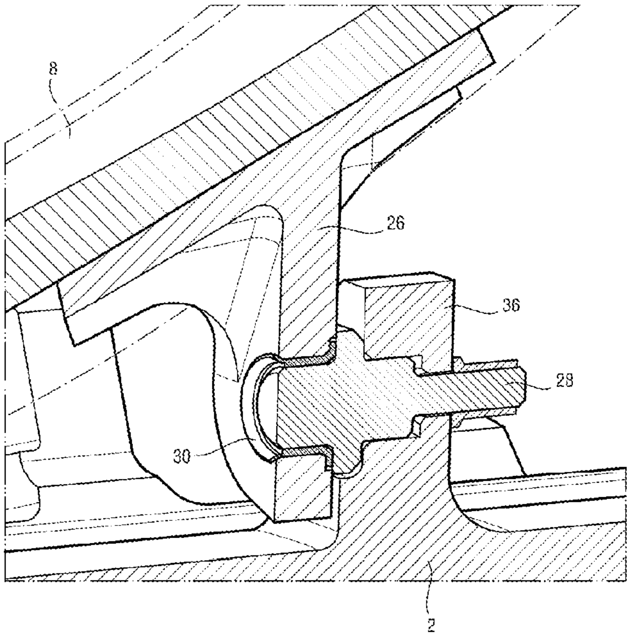
FIG. 6 is a partial section of a perspective representation of the assembly comprising the pin and of the tab of FIG. 5.

According to a first embodiment shown in FIGS. 5 and 6, the abutment face of the fitting 36 is facing an abutment face of the connection portion 26*b*, the two abutment faces being positioned in a radial plane. In other words, according to this first embodiment, the abutment faces of the fitting 36 and of the connection portion 26*b* are in a plane substantially perpendicular to the axial direction of rotation of the disc 2 and of the bladed wheel 1. According to this embodiment the attachment portion 26*a* of the tab 26 and the connection portion 26*b* having the drilled hole 30 are intersecting at an angle substantially different from 90 degrees and defined as a function of the desired inclination for the flow passage 8.

Figure 8:
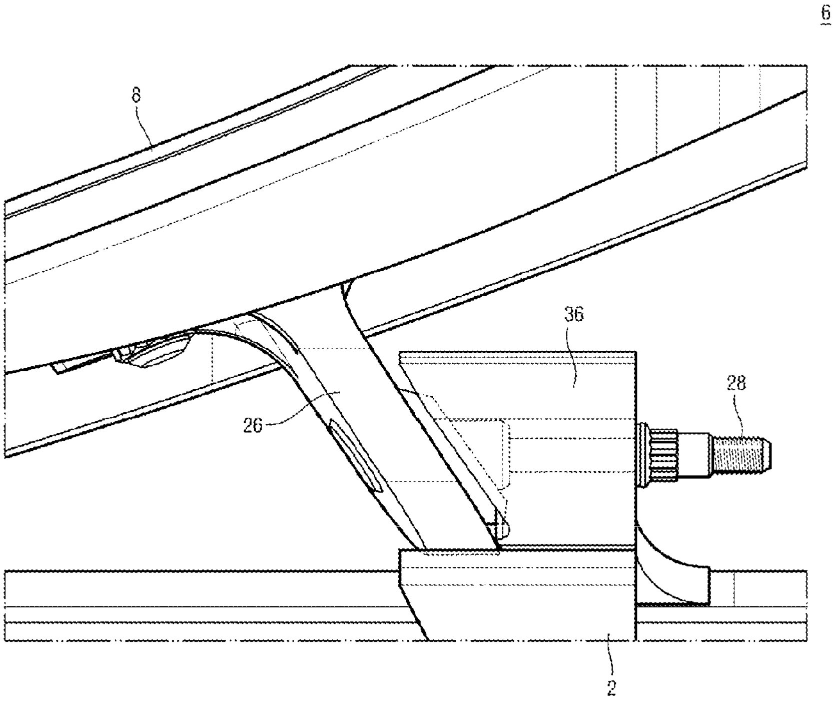
FIG. 8 is a representation of the connection with a pin and a tab according to a second embodiment of invention.

According to a second embodiment, shown in FIG. 8, the two abutment faces of the fitting 36 and of the connection portion 26*b* are positioned in a plane inclined with respect to a radial plane. In other words, according to this second embodiment, the abutment faces are not in a plane substantially perpendicular to the axial direction of rotation of the disc 2 and of the bladed wheel 1. According to this embodiment, the attachment portion 26*a* of the tab 26 and the connection portion 26*b* having the drilled hole 30 are intersecting at an angle substantially equal to 90 degrees (orthogonal). This second embodiment has the advantage of being simpler to assemble. Indeed, the orthogonal tab 26 facilitates the introduction of tools enabling screwing of the tab 26 to the flow passage wall 8.

In addition, whatever the embodiment, the pin 28 is attached to the fitting 36. It is preferably connected to the fitting by an interlocking connection, i.e. all the degrees of freedom of the pin 28 are blocked.

The pin 28 is preferably screwed to the fitting 36, as shown in FIGS. 5 and 6.

Behaviour

The use of a single pin 28 in sliding pivot connection, in combination with the circumferential lands, has the advantage of facilitating the assembly compared with a multi-pin system, while maintaining a robust system for absorbing mechanical forces and positioning the platform.

Moreover, in the case of a bird ingestion type shock, the system coupled by a single pin 28 in sliding pivot connection and circumferential lands releases degrees of freedom with respect to a multi-pin system and simplifies the arrangements of platforms 6, in order to avoid the risk of damage to the platform 6 during assembly and operation.

The installation of the platform 6 is therefore made easier by releasing these degrees of freedom while maintaining the main function of the pin 28 which is to absorb the centrifugal forces.

More specifically, on the one hand, the longitudinal positioning of the fitting 36, substantially at mid-length of the disc, and the longitudinal positioning of the tab 26 substantially at mid-length of the platform, reduces the risk of deformation of the platform 6 under the effect of the centrifugal forces that the platform 6 is subject to during operation.

In addition, the installation of the platform 6 according to the invention involves shorter assembly kinematics than for the platforms of the prior art, which reduces the necessary clearances, and therefore reinforces the mechanical structure of the connection between the platform 6 and the disc 2. It is specified that the necessary clearances are directly correlated to the displacement necessary during assembly and disassembly. In the case of the invention, the assembly/disassembly kinematics are reduced, the clearances are therefore reduced accordingly.

Finally, the use of a single pin 28 per platform 6 makes possible a lighter system (i.e. lighter than the multi-pin systems of the prior art), which is particularly advantageous in an aeronautical context in which weight management is an important issue.

Figure 7:
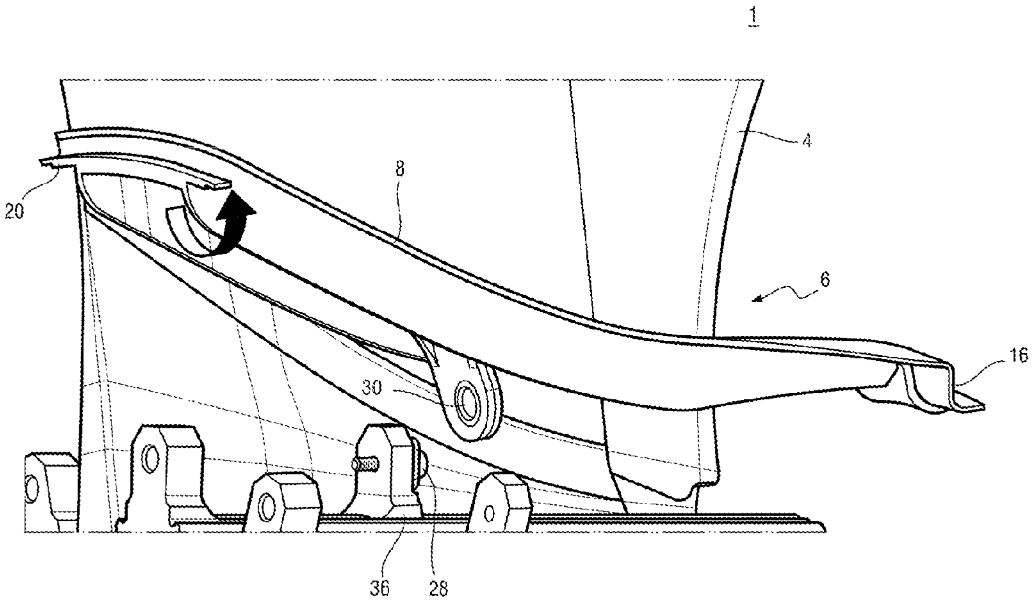
FIG. 7 is a schematic perspective representation of the removal of a platform according to the invention.

In addition, as shown schematically in FIG. 7, maintenance (i.e. removal) of the platform 6 is particularly easy. It is sufficient to combine a translational movement in order to disengage the pin, then a rotational movement around the axial direction in order to disengage the circumferential lands.

Assembly

According to another aspect, the invention relates to an assembly comprising a disc 2 for a bladed wheel 1 according to the invention and a platform 6 according to the invention, in which the disc 2 receives the platform 6.

Turbomachine

According to another aspect, the invention relates to a turbomachine comprising at least one assembly according to the invention.

Aircraft

According to another aspect, the invention relates to an aircraft comprising at least one turbomachine according to the invention.

The invention claimed is:

1. A platform for a bladed wheel,
the platform comprising a flow passage wall extending in an axial direction,
the flow passage wall having an upstream end and a downstream end and comprising two axial stiffeners,
the platform comprising radial retention means positioned at the upstream end and at the downstream end of the flow passage wall, the radial retention means being configured to each define a sliding connection with a corresponding shroud of the bladed wheel,
the platform comprising tangential retention means configured to define a slide connection between the platform and a disc of the bladed wheel,
the slide connection having an axis of rotation parallel to the axial direction, and
wherein the platform is in sliding connection along the axial direction relative to the disc of the bladed wheel.

2. The platform according to claim 1, wherein the tangential retention means comprise a pin and a tab having a drilled hole configured for receiving the pin such that the assembly of the tab and the pin forms the sliding pivot connection.

3. The platform according to claim 2, wherein the tab is attached to the flow passage wall and the pin is configured for being attached to the disc of the bladed wheel.

4. The platform according to claim 1,
wherein the radial retention means comprise an upstream circumferential land and a downstream circumferential land,
the upstream circumferential land and the downstream circumferential land being configured for being respectively engaged in a corresponding upstream shroud and a corresponding downstream shroud of the bladed wheel.

5. The platform according to claim 1 wherein the flow passage and the stiffeners are made of composite materials.

6. An assembly,
the assembly comprising:
a bladed wheel,
and a platform according to claim 3,
wherein the platform is received in the disc, and
the disc has a fitting in which is attached the pin that is configured to be engaged in sliding pivot connection in the tab of the platform.

7. An assembly,
the assembly comprising:
a bladed wheel and a platform according to claim 4,
wherein the platform is received in the disc,
the disc assembly comprising at least the downstream shroud receiving the downstream circumferential land and at least the upstream shroud receiving the upstream circumferential land.

8. A turbomachine comprising at least one disc assembly according to claim 7.

9. An aircraft comprising at least one turbomachine according to claim 8.

10. A platform for a bladed wheel,
the platform comprising a flow passage wall extending in an axial direction,
the flow passage wall having an upstream end and a downstream end and comprising two axial stiffeners,
the platform comprising radial retention means positioned at the upstream end and at the downstream end of the flow passage wall, the radial retention means being configured to each define a sliding connection with a corresponding shroud of the bladed wheel,
the platform comprising a single tangential retention means configured to define a slide connection between the platform and a disc of the bladed wheel,
the slide connection having an axis of rotation parallel to the axial direction, and
wherein the platform is in sliding connection along the axial direction relative to the disc of the bladed wheel.

11. A platform for a bladed wheel,
the platform comprising a flow passage wall extending in an axial direction,
the flow passage wall having an upstream end and a downstream end and comprising two axial stiffeners,
the platform comprising radial retention means positioned at the upstream end and at the downstream end of the flow passage wall, the radial retention means being configured to each define a sliding connection with a corresponding shroud of the bladed wheel,
the platform comprising a tangential retention means configured to define a slide connection between the platform and a disc of the bladed wheel, the slide connection having an axis of rotation parallel to the axial direction, and
wherein the platform is in sliding connection along the axial direction relative to the disc of the bladed wheel, and
wherein the tangential retention means comprise a support fixed to the disc, a pin extended radially from the support and a tab having a drilled hole configured to insert on the pin such that the assembly of the tab and the pin forms the sliding pivot connection.

12. A platform for a bladed wheel according to claim 11,
the platform comprising a flow passage wall extending in an axial direction,
the flow passage wall having an upstream end and a downstream end and comprising two axial stiffeners,
the platform comprising radial retention means positioned at the upstream end and at the downstream end of the flow passage wall, the radial retention means being configured to each define a sliding connection with a corresponding shroud of the bladed wheel,
the platform comprising a single tangential retention means configured to define a slide connection between the platform and a disc of the bladed wheel, the slide connection having an axis of rotation parallel to the axial direction, and
wherein the platform is in sliding connection along the axial direction relative to the disc of the bladed wheel, and
wherein the tangential retention means comprise a support fixed to the disc, a pin extended radially from the support and a tab having a drilled hole configured to insert on the pin such that the assembly of the tab and the pin forms the sliding pivot connection.

* * * * *